US012752464B2

(12) United States Patent
Nielsen

(10) Patent No.: US 12,752,464 B2
(45) Date of Patent: Oct. 6, 2026

(54) OVEN ARRANGEMENT AND METHOD FOR MANUFACTURING PREFORM BUILDING ELEMENTS USED FOR BUILDING A ROTOR BLADE OF A WIND TURBINE

(71) Applicant: Siemens Gamesa Renewable Energy A/S, Brande (DK)

(72) Inventor: Mogens Nielsen, Aalborg (DK)

(73) Assignee: Siemens Gamesa Renewable Energy A/S, Brande (DK)

(*) Notice: Subject to any disclaimer, the term of this patent is extended or adjusted under 35 U.S.C. 154(b) by 286 days.

(21) Appl. No.: 18/689,108

(22) PCT Filed: Aug. 31, 2022

(86) PCT No.: PCT/EP2022/074223
§ 371 (c)(1),
(2) Date: Mar. 5, 2024

(87) PCT Pub. No.: WO2023/036670
PCT Pub. Date: Mar. 16, 2023

(65) Prior Publication Data

US 2024/0399626 A1 Dec. 5, 2024

(30) Foreign Application Priority Data

Sep. 10, 2021 (EP) .................................... 21196043

(51) Int. Cl.
*B29C 49/68* (2006.01)
*B29C 35/04* (2006.01)
(Continued)

(52) U.S. Cl.
CPC .... *B29C 35/045* (2013.01); *B29C 2035/1658* (2013.01); *B29L 2031/085* (2013.01)

(58) Field of Classification Search
CPC ... B29D 99/0028; B29C 35/045; B29C 49/68; F27B 9/18; F27B 5/14; F27B 17/00;
(Continued)

(56) References Cited

U.S. PATENT DOCUMENTS 2,709,078 A * 5/1955 Wyatt ................ C22B 34/1272
202/205
4,154,433 A * 5/1979 Kato ........................ C21D 1/74
432/208
(Continued)

FOREIGN PATENT DOCUMENTS

CN 206019324 U * 3/2017 .............. F27B 17/02
CN 109414311 A * 3/2019 .............. F27B 17/00
(Continued)

OTHER PUBLICATIONS

PCT International Search Report and Written Opinion of International Searching Authority mailed Jan. 3, 2023 corresponding to PCT International Application No. PCT/EP2022/074223 filed Aug. 31, 2022.

*Primary Examiner* — Gregory A Wilson
(74) *Attorney, Agent, or Firm* — Schmeiser Olsen PLLC

(57) ABSTRACT

An oven arrangement is provided, adapted to heat preform building material arranged on at least one plate-like carrier for producing preform building elements used for building a rotor blade of a wind turbine, including at least one oven and at least one lifting means, wherein the oven includes a housing adapted to receive the carrier, wherein the housing includes an opening at a bottom side of the housing for positioning the carrier in the interior of the housing by lowering the oven over the carrier using the lifting means, wherein the oven includes at least one heating means and/or wherein the oven is connectable to a heat supplying means.

17 Claims, 5 Drawing Sheets

(51) Int. Cl.

| | |
|---|---|
| *B29C 35/16* | (2006.01) |
| *B29L 31/08* | (2006.01) |

(58) Field of Classification Search
CPC ...... F27B 17/025; F27B 5/10; F27B 17/0033; F27D 3/00; F27D 3/12; F27D 1/00
See application file for complete search history.

(56) References Cited

U.S. PATENT DOCUMENTS

| | | | | | |
|---|---|---|---|---|---|
| 7,665,988 | B2 * | 2/2010 | Kim | F27B 5/14 414/940 |
| 9,480,544 | B2 * | 11/2016 | Rohner | F27B 17/025 |
| 9,726,431 | B2 * | 8/2017 | Jussel | F27D 21/04 |
| 9,982,944 | B2 * | 5/2018 | Pokorny | A61C 13/20 |
| 10,260,811 | B2 * | 4/2019 | Rohner | A61C 13/20 |
| 11,460,251 | B2 * | 10/2022 | Weisbeck | F27B 17/025 |
| 2016/0195062 | A1 | 7/2016 | Marcoe et al. | |
| 2020/0384707 | A1 * | 12/2020 | Lehmann Madsen | B29C 70/38 |

FOREIGN PATENT DOCUMENTS

| | | | | |
|---|---|---|---|---|
| CN | 110116148 | A * | 8/2019 | F27D 9/00 |
| CN | 111879119 | A * | 11/2020 | F23K 3/16 |
| EP | 4067037 | A1 | 10/2022 | |
| EP | 4067038 | A1 | 10/2022 | |
| EP | 4079483 | A1 | 10/2022 | |
| EP | 4088901 | A1 | 11/2022 | |
| EP | 4091785 | A1 | 11/2022 | |
| EP | 4091803 | A1 | 11/2022 | |
| EP | 4116053 | A1 | 1/2023 | |
| EP | 4137288 | A1 | 2/2023 | |
| EP | 4147843 | A1 | 3/2023 | |
| EP | 4147864 | A1 | 3/2023 | |
| EP | 4155063 | A1 | 3/2023 | |
| EP | 4183543 | A1 | 5/2023 | |
| JP | 2017110519 | A | 6/2017 | |
| KR | 20030089631 | A * | 11/2003 | F27D 9/00 |
| TW | 201338961 | A | 10/2013 | |
| WO | 2019115337 | A1 | 6/2019 | |
| WO | 2019115522 | A1 | 6/2019 | |
| WO | 2019145240 | A1 | 8/2019 | |
| WO | 2020127926 | A2 | 6/2020 | |

* cited by examiner

OVEN ARRANGEMENT AND METHOD FOR MANUFACTURING PREFORM BUILDING ELEMENTS USED FOR BUILDING A ROTOR BLADE OF A WIND TURBINE

CROSS-REFERENCE TO RELATED APPLICATIONS

This application claims priority to PCT Application No. PCT/EP2022/074223, having a filing date of Aug. 31, 2022, which claims priority to European Application No. 21196043.0, having a filing date of Sep. 10, 2021, the entire contents all of which are hereby incorporated by reference.

FIELD OF TECHNOLOGY

The following relates to an oven arrangement, adapted to heat preform building material arranged on at least one plate-like carrier for producing preform building elements used for building a rotor blade of a wind turbine, comprising at least one oven and at least one lifting means, wherein the oven comprises a housing adapted to receive the carrier. Furthermore, the following relates to a method for manufacturing preform building elements used for building a rotor blade of a wind turbine.

BACKGROUND

Wind turbines comprise a rotor with a plurality of rotor blades, generally for converting wind energy into electrical energy by a generator. Due to the enormous size of the wind turbine blades, their manufacturing is a major challenge in the manufacture of wind turbines. Normally, the wind turbine blades are fabricated from fiber-reinforced material involving the handling of large parts like fiber mats, in particular for casting the shell of the wind turbine blade.

One technology for facilitating the fabrication of the wind turbine blades is the usage of preforms, or preform building elements, respectively, which are preformed smaller blade parts or segments which are used for building the respective blade shell. These preforms are prefabricated separately and arranged and aligned according to the requested overall geometry of the blade in a blade mold for casting an entire rotor blade, or a larger rotor blade part, respectively.

Each preform, which usually has a slightly bended geometry with a length of, for example 10 to 12 m and width of for example 3 to 5 m, is prefabricated in a specific mold. The mold comprises a respective form part, in which the preform building elements like fiber mats and an adhesive are arranged. In some embodiments, additional elements like core elements may be used as well. The core elements may be flexible elements, for instance flexible balsa wood plates, or rigid elements, for instance rigid sheets of polyethylene terephthalate (PET). These elements are fixed in the respective mold part by applying a vacuum in order to obtain a preform corresponding to the shape of the mold part. For fixation of the preform building material, a foil can be used to cover the components so that the vacuum may be applied to the space between the foil and the surface of the mold, on which the building material is arranged.

A consolidation of the preform building elements occurs by heating of the adhesive, which is arranged locally between the components of the preform material to locally attach them towards each other. By the heating, the adhesive, or binding agent, respectively, is melted for locally fixating the fiber mats and the core elements by gluing them in the binder matrix provided by the molten binding agent. After this heating operation, when the preform elements have been consolidated for forming the preform part, the preform needs to be cooled to be sufficiently stable to be handled by crane equipment or any other comparable handling or lifting means like a vacuum suction lifting equipment.

This way of producing the preforms is quite cumbersome. The molds used for producing the preforms are very complicated in the setup, especially as a heating system like heating blankets and heating pipes below the mold surface have to be used. In addition, also for the cooling, a cooling system may be required for avoiding long cooling durations leading to comparatively expensive preform molds. Since in each mold only a single preform element may be fabricated and since for the fabrication of a wind turbine blade a large number of preform elements is required, also a large number of molds is needed, usually twenty or more preform molds for enabling parallel fabrication of preform elements required for the fabrication of one single wind turbine blade.

Further, as both the heating and cooling treatment is performed with the preform building elements respectively the hot preform being arranged in the mold, the mold is occupied. As both the heating and the cooling process takes a remarkable time, the whole mold is blocked during these long-lasting procedures and the productivity of the mold is extremely low.

This is even enhanced by the fact that the mold cannot be preheated. The temperature treatment needs to start from room temperature as all building elements need to be arranged separately in the mold before the vacuum fixation occurs and in particular before the binding agent is thermally activated. Further, it is necessary to cool the hot preform down to room temperature in order to secure its stability for handling it manually or with lifting equipment.

Further, the time during which the respective mold is occupied may even be extended since sometimes a preform is not removed immediately after cooling it but remains for a certain time in the mold if no storing capacity is given. Finally, after the preform element has been lifted out of the mold, it is necessary to clean the mold surface for the next manufacturing process, wherein also the cleaning step takes its time. Still the mold cannot be used until this cleaning step is finished.

SUMMARY

An aspect relates to a means for heating preform building material for producing preform building elements.

According to embodiments of the invention, this aspect is solved by an oven arrangement as initially described, wherein the housing comprises an opening at the bottom side of the housing for positioning the carrier in the interior of the housing by lowering the oven over the carrier using the lifting means, wherein the oven comprises at least one heating means and/or wherein the oven is connectable to a heat supplying means.

The oven arrangement comprises an oven and a lifting means, wherein the oven can be lifted and lowered by the lifting means. The housing of the oven comprises an opening at the bottom side of the housing so that the oven may be lifted using the lifting means and arranged above at least one plate-like carrier, on which preform building material is arranged. Then, the oven may be lowered over the carrier to position the carrier inside the housing. In the lowered position, the oven encloses the at least one carrier with the preform building material in particular completely. When the carrier and consequently also the preform building material arranged on the carrier is received in the interior of the housing, the preform building material may be heated using the oven.

The oven, which may also be referred to as a furnace, is adapted to heat the interior of the housing and therefore to heat the preform building material on the carrier, in particular for thermal activation of the binding agent. The oven may be adapted to heat the interior to temperatures between 70° C. and 130° C., depending on the type of binding agent used in the preform building material. For heating of the preform building material, the oven may comprise a heating means or the oven may be connectable to a heat supply the oven arrangement, which supplies heat to the interior of the housing, in which the at least one plate-like carrier with the building material is arrangeable.

The preform building material may include in particular one or more textile components, in particular fiber sheets or the like, and a binding agent for locally adhering the components. In addition to textile components, rigid core elements and further components, which are to be integrated in the structure of the preform building element to be fabricated, may be included.

The plate-like carrier may be a flat plate, or it may be a tray comprising for instance a curved surface according to the shape of the preform building element to be fabricated. In particular, the plate-like carrier may comprise a concave or a convex top surface. The plate-like carrier may be the molding surface of a preform mold. It is possible that the oven is lowered on one or more molds each comprising a carrier or that one or more plate-like carriers are removed from the molds prior to their positioning inside the oven.

The size of the housing and consequently also the size of the opening at the bottom side of the housing and/or the interior volume of the housing accessible through the opening in the bottom side of the housing have a size comparable to the size of the preform building elements to be manufactured from the preform building material arranged on the plate-like carrier, or corresponding to the size of the plate-like carrier, respectively. In particular, the opening at the bottom side of the housing and consequently also the interior volume may have a width between 1 m and 4 m and a length between 2.5 m and 12 m. Also, a larger width and/or a larger length of the opening and/or the housing is possible, so that a plurality of carriers arranged juxtaposed may be received in the housing.

The height of the oven, and correspondingly the height of its inner volume, may depend on the shape and the numbers of carriers that are receivable in the oven and/or on the height of a preform mold, if the oven shall be arranged on a preform mold arrangement. The height may be for instance between 0.5 m and 4 m.

By using the oven of the oven arrangement to heat the plate-like carrier, a preform mold without heating elements can be used. Only the plate-like carrier is required for arranging the preform building material since the heating can occur using the oven arrangement. This has the advantage that the preform molds comprising the plate-like carrier, for instance as a molding surface, may be very simple, since no heating means has to be included.

Furthermore, a loading and/or unloading of the plate-like carrier into a stationary oven may be avoided, since the oven may be directly arranged around the plate-like carrier for heating the preform building material. By the lifting means, also a lateral movement of the oven may be possible, so that the oven may be brought to the location of the carrier to avoid a transport of the carrier and therefore to avoid damage to the preform building material arrangement on the carrier surface.

The oven may be lifted from one location to another using the lifting means, so that a flexible use of the oven is obtained. This allows for subsequently arranging the oven in different position for heating the preform building material on different plate-like carriers. The oven can be lifted and lowered in a first location to enclose one or more carriers with preform building material, apply heat for a certain time and at a certain temperature, and after completion, the oven is raised and to allow for a cooling the preform building element, or the preform building elements, respectively, while the oven is moved to a second location to repeat the process.

Since the entire oven including the housing is removable from the hot preform building elements, a quick cooling becomes possible. As a further advantage, the second heating process begins shortly after the first heating process has ended so that the internal heat and/or the elevated temperature of the oven may be maintained at least to some extent reducing the energy requirement for the second heating process.

In an embodiment, the housing is adapted to receive a plurality of carriers, in particular a plurality of carriers arranged above each other in a rack. This allows to use very simple constructed molds, in which the plate-like carriers are supported for instance on a frame structure for arranging the preform building material. After arrangement of the preform building material, the plate-like carrier can be removed from the frame structure and arranged in a rack, in particular in a rack that allows for arranging a plurality of plate-like mold carriers above each other.

Subsequently, the oven can be lowered over the rack and therefore over a plurality of carriers, so that a simultaneous heating of a plurality of plate-like carriers each comprising preform building material arranged on their surface may occur. The preform mold for arranging the preform building material is reduced basically to the plate-like carrier, so that no additional heating means or the like is required for each of the numerous preform molds required for the fabrication of a wind turbine rotor blade.

The movability of the oven by the lifting means may prevent a transport of the at least one carrier, or of the plurality of carriers arranged in a rack, since the oven can be moved to the carriers. This significantly reduces the process time, since in particular a plurality of carriers can be arranged in the oven simultaneously and any loading and/or unloading of the carriers is avoided. Additionally, the risk of damaging the preform building material arrangement on the plate-like carrier is reduced, when the plate-like carrier has not to be transported to, and/or inserted into and removed from a stationary oven. Additionally, the rack once loaded with the carriers can follow along with the individual preform elements until the elements are finally brought to the blade mold to significantly reducing the process time.

In an embodiment, the oven comprises at least one sealing means arranged at least partly around the opening on a bottom side of the housing and/or the oven arrangement comprises a sealing arrangement comprising one or more sealing structures for sealing the interior of the housing when the oven is in a lowered position. The sealing means, which is arranged at least partly around the opening of the housing, and/or the sealing structures of a sealing arrangement, which are arranged for instance on a floor of a manufacturing facility, are used to seal the interior of the oven from the surroundings, in particular to avoid the escape of heat around the opening of the housing when the oven has been lowered over the at least one carrier.

The sealing means and/or the sealing structures of the sealing arrangement may comprise of a flexible sealing material such as a rubber band, so that the housing may be sealed, in particular against a floor, when the oven is in a lowered position encompassing the at least one plate-like carrier that is received in the interior. In particular, the sealing structures may seal a part of the circumference of the opening, so that a plate-like carrier or a rack comprising a plurality of plate-like carriers may be placed between the sealing structures, for instance by pushing it over the floor. The sealing means arranged at least partly around the opening of the housing may seal the remainder of the circumference, so that the sealing means at the housing and the sealing structures on the floor seal the entire circumference of the opening without obstructing the arrangement of a carrier, in particular of a rack with a plurality of carriers, between the sealing structures.

In an embodiment, the heating means comprises at least one resistive heating means, at least one radiating heating means, at least one heating means based on a circulating liquid, and/or at least one convection means, and/or the heating means is adapted additionally for a cooling of the interior of the housing. The usage of a heating means in the oven for heating preform building material arranged in the interior has the advantage that no connection of the oven to an external heat supply the oven arrangement has to be established. This will make the oven arrangement smaller, since no external pipe connections or the like for the connection to the heat supply means are required. Furthermore, the lifting and/or the lateral moving of the oven is facilitated when no connections to an external heating means are present.

The heating means may comprise a radiating heating means, for instance an infrared lamp or the like, and/or a resistive heating means comprising for instance a plurality of heatable resistors. It is possible that the heating means comprises at least one convection means like a fan for distributing hot air created by the heating means in the interior of the housing to obtain an even heating of the preform building material.

The heating means may comprise at least one heating means based on a circulating liquid, for instance a liquid circulating in pipes in the housing or arranged on at least one inner wall and/or on at least one outer wall of the housing. The liquid may be heated using a heating device at the oven or a further heating device of the oven arrangement, which is connected to the oven, for instance by connection means like flexible pipes, tubes or hoses.

In some embodiments, the heating means may also be adapted for a cooling of the interior of the housing, hence, the heating means may also comprise cooling means for cooling the interior. This allows for using the oven also for an active cooling of the preform building material after a heating process. For instance, a heating means based on a circulating liquid may be used for cooling by the circulation of a cooled liquid. In addition, also other cooling means, for instance electrical cooling means or an air conditioning device comprising a compressor, may be used.

In an embodiment, the heat supplying means is a hot air supplying means, wherein the housing of the oven comprises at least one air inlet, through which air supplied by the heat supplying means is suppliable to the interior of the housing, and at least one air outlet, through which air supplied to the interior of the housing is emittable to the surroundings of the oven and/or returnable to the heat supplying means. The air inlet may be connected to an external heat supplying the oven arrangement for instance by flexible tubes, pipes or hoses. Likewise, also the air outlet may be connected to the heat supplying means for returning the hot air from the oven reducing the energy requirement of the heat supplying means. Alternatively, the hot air may be emitted to the surroundings through the air outlet, which may be provided in this case as an opening, in particular a closeable opening, in the housing.

The heat supplying means may be connected to a plurality of liftable ovens of the oven arrangement to parallelly provide heat to the ovens for increasing the efficiency of the heat generation in the oven arrangement. The usage of a heat supplying means connected to the oven has the advantage that the oven itself does not have to comprise an internal heating means so that the construction of the oven becomes comparatively simple, and the weight of the oven can be reduced for facilitating the lifting of the oven.

In an embodiment, the air inlet and the air outlet are arranged at opposing sides of the housing and/or at opposing edges of a housing side, in particular directed downwards for connection to a connection the heat supplying means protruding from a floor. The air inlet and the air outlet may comprise a connecting section, which is directed downwards to a floor, so that the oven may be lowered also on the connecting means protruding from the floor connecting the oven to the heat supplying means when the oven is lowered on the at least one carrier.

The connection to the heat supplying means occurs during the lowering of the oven on the at least carrier so that no additional process steps have to be performed reducing the process time required for the heating step. Through the connection means protruding from the floor, the hot air may be provided from the heat supplying means, so that it is directed in the interior of the housing by the air inlet. Correspondingly, the air outlet and the corresponding connection means from the heat supplying means allows for returning the hot air to the heating means enabling a cycle of the air for reducing the energy consumption of the heating process.

In an embodiment, the oven arrangement comprises at least one flow reverse means connected to the air inlet and the air outlet to invert the air flow between the air inlet and the air outlet of the oven. This allows to alternate between different directions, in which the air streams through the interior of the housing. By alternating the air flow at least once during the heating process, a more uniform heating of the preform building material arranged on the at least one plate carrier may be obtained.

In an embodiment, the oven is adapted to receive a plurality of carriers, which are arranged above each other in a receiving space in the interior of the housing, wherein the housing comprises at least one air guiding means adapted to guide and/or to adjust the partial air flows above and/or underneath the individual carriers of a received plurality of carriers. In an oven connected to an external heat supplying means, the air guiding means may be arranged between the receiving space and the air inlet and/or between the receiving space and the air outlet. Correspondingly, in an oven comprising a heating means, the guiding means may be arranged between the heating means and the receiving space and/or between at least one wall of the housing, in particular a wall opposing the heating means, and the receiving space, respectively.

The air guiding means may allow for adjusting a flow of hot air supplied by the heat supplying means and/or heated by the heating the oven to enable an individual heating of different preform building material arrangements on different carriers. Therefore, the partial air flows above and/or underneath the individual carriers, which are for instance arranged above each other in a rack with a gap between adjacently arranged carriers, may be adjusted by the air guiding means. By increasing or decreasing the air flow above and/or underneath the individual carriers, the heat input, or the heat exposure, respectively, of the preform building materials on the different carriers may be adapted individually, so that different thicknesses and/or different preform building material compositions on the carriers may be heated differently.

The air guiding means may be adjustable in particular by a control unit of the oven arrangement, so that an automated heating process is possible, facilitating in particular the individual heating and/or cooling of a plurality of different types of preform building elements to be manufactured simultaneously positioned in the oven. In particular, the entire heating process may be controlled and monitored by a control unit of the oven arrangement and/or a plurality of sensors arranged in the oven, so that no manual work is needed to operate the oven. In addition, the heating and/or cooling process can easily be modified in the future, if a process with different parameters like temperature, time, and/or flow is desired.

In an embodiment, the air guiding means is adapted to create a meandering air flow in the interior of the housing, wherein the partial air flows stream in alternating direction between the carriers of a plurality of carriers received in the receiving space. By air streaming in alternating directions above and/or underneath the individual carriers, a more uniform heat input into the preform building material may be obtained.

In an embodiment, the air guiding means comprises one or more dampers, wherein the dampers each comprise a plurality of adjustable lamellae, with which the air flow above and/or underneath the individual carriers is adjustable. The size and/or the distance of the lamellae corresponds in particular to the distance and/or the gaps between the plurality of carriers in the receiving space. By adjusting the position of one or more of the lamellae, the air flow above and/or underneath the individual carriers may be adjusted and/or shut off. In addition, or alternatively, also an alternating direction of the air flow meandering through the plurality of carriers may be obtained by a corresponding positioning of the adjustable lamellae.

The dampers, in particular the individual lamellae, may be sensor-controlled and adjustable by a control unit of the oven arrangement to allow for an automatic control of the individual heating processes of the different preform elements to be fabricated. Thus, one avoids to have only preform building elements of one type or specification in the oven at the same time, or to take some of the elements out during a heating and/or a cooling process if they require less air flow exposure, or less temperature exposure, respectively.

In an embodiment, the heat supplying means is adapted to supply additionally unheated and/or cooled air to the oven. This may speed up the process time since a cooling of the preform elements arranged in the interior of the oven may occur more quickly, when unheated and/or cooled air is provided to the oven. In addition, or alternatively to a cooling means arranged as a part of the oven, also the heat supply means may provide unheated and a cooled air to the oven. This has in particular the advantage that the preform elements may be cooled in the interior of the oven before the oven is lifted from the at least one plate-like carrier, so that the preform elements may be touched and further processed immediately after the oven has been lifted.

In an embodiment, the lifting means is a crane attachable or attached to the oven or a lifting device supporting the oven. By the crane, the oven can be lifted from the at least one carrier and/or lowered on the at least one carrier, respectively. Furthermore, also a lateral movement by the crane may be possible so that the oven can be moved to different positions for heating of different plate-like carriers.

Alternatively, the lifting means may be a lifting device which supports the housing of the oven on the floor. This allows for lifting the oven in a more compact arrangement without the need for a crane, so that it may be used in production sites with a lower ceiling height. The lifting device may be for instance a hydraulic and/or electromotive lifting device. The lifting device may comprise wheels for moving or rolling the oven, so that also a lateral movement of the oven and therefore a change of the oven between different positions becomes possible.

In an embodiment, the lifting device comprises at least one frame structure and a motor arrangement comprising one or more motors coupled to the frame structure and the housing, wherein the housing is liftable and lowerable along the frame structure by the motor arrangement. This allows for a simple construction of the oven arrangement and facilitates the arranging of the oven arrangement, since the frame structure may be moved laterally to the floor, for instance by wheels or rollers attached to the frame structure.

In an embodiment, a top portion of the frame structure is partly foldable and/or collapsible when the oven is in a lowered position. This allows for reducing the height of the frame structure, for instance for transporting the oven between different plate-like carriers, or different production sites, respectively.

In an embodiment, the housing is a modular housing comprising two or more housing segments removably attached to each other. By building the housing of the oven from a plurality of housing modules, for instance two or more separate modules that are joint together for constituting the complete housing of the oven, a transport of the oven can be further facilitated. In addition, by adding or removing additional segments of the oven, the size of the housing may be increased or decreased and therefore adapted to different sizes of carriers to be arranged in the interior of the housing. This allows for using the oven arrangement for manufacturing differently shaped preform building elements, in particular with varying lengths.

Furthermore, using a housing adapted to the size of the preform building elements to be fabricated may reduce the energy consumption of the heating process, since an unnecessary heating of an unoccupied portion of the interior volume can be avoided. Additionally, in the case that a housing segment needs to be taken out for repair and/or inspection, it can easily be replaced with another housing segment to allow a continuous use of the oven without having to wait for a complete oven to be serviced.

The modular housing may comprise two end segments and optionally one or more intermediate segments. Both end segments of the oven may be constructed in the same way if the oven, for example, is equipped with heating means at both ends. This means that the oven in principle only comprises two different types of segments, since also the intermediate segments may be constructed equally. This significantly reduces the effort for manufacturing of the oven so that a manufacture of the oven by local suppliers, for instance close to an erection site of the wind turbines manufactured from the preform building elements, is facilitated.

A method according to embodiments of the invention for manufacturing preform building elements used for building a rotor blade of a wind turbine comprises the steps of Providing a carrier arrangement comprising one or more carriers and an oven arrangement comprising an oven and a lifting means, Providing preform building material on the one or more carriers, Lowering the oven lifted by the lifting means on the carrier arrangement, and Heating the preform building material using the oven.

In an embodiment, an oven arrangement according to embodiments of the invention is used in the method according to embodiments of the invention.

All details and advantages described in relation with the oven arrangement according to embodiments of the invention apply correspondingly to the method according to embodiments of the invention and vice versa.

BRIEF DESCRIPTION

Some of the embodiments will be described in detail, with references to the following Figures, wherein like designations denote like members, wherein.

DETAILED DESCRIPTION

Figure 1:
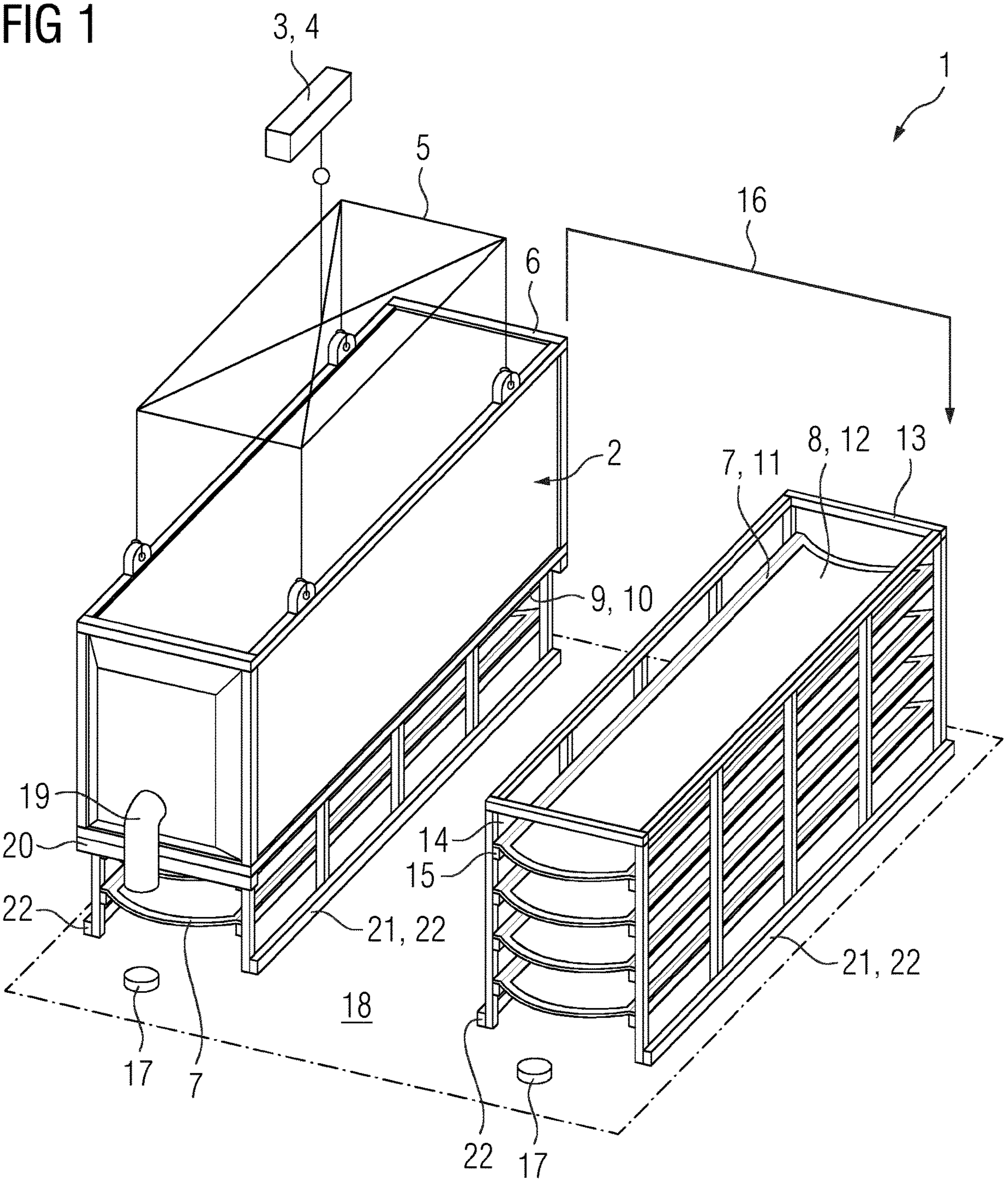
FIG. 1 shows a first embodiment of an oven arrangement.

In FIG. 1, a first embodiment of an oven arrangement 1 is shown. The oven arrangement 1 comprises an oven 2 and a lifting means 3, which is attached to the oven 2. In this embodiment, the lifting means 3 is a crane 4, which is depicted schematically, and which is attached by a yoke 5 to a housing 6 of the oven. By the lifting means 3, the oven 2 may be lifted and lowered. Furthermore, also a lateral movement of the housing by the lifting means 3 is possible.

The housing 6 of the oven 2 is adapted to receive one or more plate-like carriers 7, on which preform building material 8 is arranged for producing preform building elements used for building a rotor blade of a wind turbine. The housing 6 comprises on its bottom side 9 with an opening 10, so that the oven 2 can be lowered on the at least one plate-like carrier 7 for positioning the carrier 7 in the interior of the housing 6.

The plate-like carrier 7 may comprise a flat shape or, as depicted, a curved shape with for example a concave surface 11, on which the preform building material 8 is arranged. The preform building material 8 comprises in particular textile layers of a fiber-based material like glass fibers, carbon fibers and/or aramid fibers. The textile layers are arranged in particular at least partly overlapping, wherein a binding agent in arranged locally between the different layers. In some embodiments, also rigid core components, for instance elements made of balsa wood, may be used as parts of the preform building material 8.

The preform building material 8 may be covered by a vacuum film 12 and/or arranged in a vacuum bag for maintaining the arrangement of the individual components of the preform building material 8 on the surface 11 of the carrier 7. The vacuum film 12 may continue to cover the preform building material 8 after arrangement of the preform building material 8 on the carrier 7, or the manufactured preform element after heating and solidification of the binding agent, respectively, throughout any subsequent steps including the heating step in the oven 2. In particular, the vacuum established underneath the vacuum film 12 is at least maintained until the heating step is finished. The vacuum film 12 may be released and removed prior to a placement of the manufactured preform element in a dedicated blade mold for manufacturing the rotor blade, or a rotor blade part, respectively.

A plurality of carriers 7 is arranged above each other in a rack 13. Between the individual carriers 7, a gap 14 is created. The carriers 7 may be arranged in the rack 13 for instance by sliding them on rails 15 attached to the rack 13. The rack 13 loaded with the carriers 7 and the preform building material 8 may be driven to the oven arrangement 1, where the rack 13 may be parked, for instance as shown for the right rack 13 in FIG. 1, ready to have the oven 2 arranged over it.

As shown schematically by the arrow 16, the oven 2 may be lifted from the first position, or from a first plurality of plate-like carriers 7, respectively, to a second position and onto a second plurality of plate-like carriers 7 shown in the right side of FIG. 1. The arrangement of the oven 2 around the racks 13 allows for using the oven 2 to simultaneously heat a plurality of plate-like carriers 7, or a plurality of different preform building material arrangements on the individual carriers 7, respectively, in each of the positions. The dimensions of the oven 2 may be adapted to the size of the racks 13. The oven 2 may be dimensioned to cover as many different sizes of preform elements as possible, i.e. of any given size used for the preparation of a wind turbine rotor blade.

In this embodiment, the oven 2 is connectable to a heat supplying means 31 (not depicted in FIG. 1) of the oven arrangement 1, which is arranged externally from the oven 2, or its housing 6, respectively. The heat supplying means 31 is adapted to provide hot air to the interior of the housing 6. Therefore, the heat supplying means 31 comprises connection means 17, which are protruding from a floor 18. The housing 6 of the oven comprises at least one inlet 19 through which hot air from the heat supplying means 31 is suppliable to the interior of the housing 6. Alternatively, also a connection between the oven 2 and the heat supplying means using connection means like flexible tubes, pipes or hoses arranged above the floor 18 is possible.

To avoid that air escapes from the interior of the housing 6, the oven 2 comprises one or more sealing means 20, which are arranged at least partly around the circumference of the opening 9 on the bottom side 10 of the housing 6. Additionally, the oven arrangement 1 comprises a sealing arrangement 21, which comprises a plurality of sealing structures 22 arranged on the floor 18. By the sealing means 20 and the sealing arrangement 21, the entire circumference of the opening 9 and therefore also the interior of the housing 6 can be sealed when the oven 2 is in the lowered position completely enclosing the plurality of carriers 7, or the rack 13, respectively. Please note that in FIG. 1 on the left side, the oven is shown in a partially lowered position only. In the fully lowered position, the sealing means 20 are in direct contact with the floor 18 and the bottom side 10 of the housing is in direct contact with the sealing structures 22 of the sealing arrangement 21, respectively.

Providing the sealing means 20 at the housing 6 has the advantage that the rack 13 may be moved between the sealing structures 22, for instance by pushing it over the floor 18 without being obstructed by the sealing arrangement 21 arranged on the floor 18. For facilitate the positioning of the rack 13, the rack 13 may comprise a plurality of wheels or rollers allowing to move the rack 13 on the floor 18.

Figure 2:
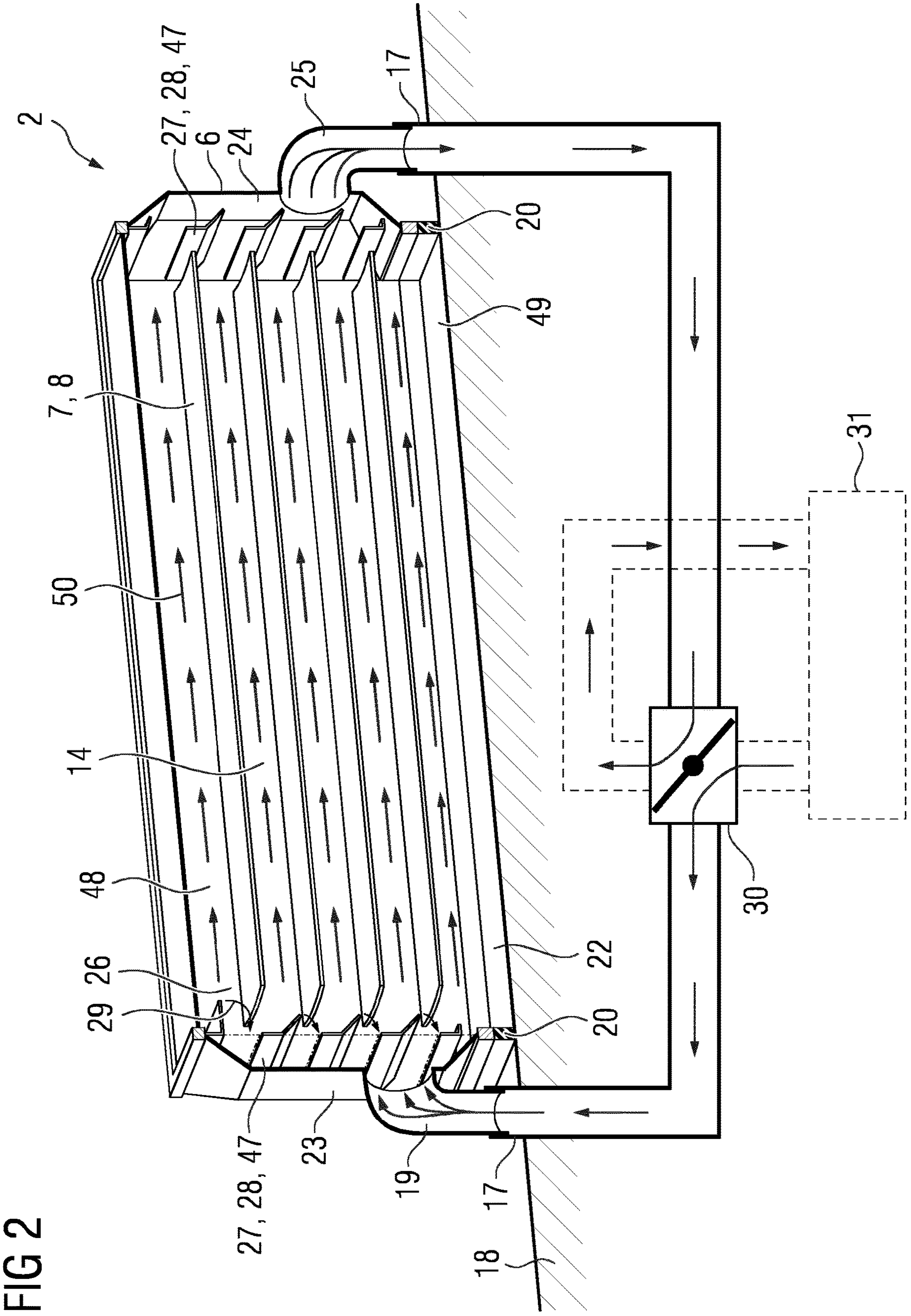
FIG. 2 shows a detailed view of the oven of the first embodiment of the oven arrangement.

In FIG. 2, a perspective side view of the oven 2 arranged in the lowered position is shown. The air inlet 19 is arranged on a first side 23 of the housing. On an opposing side 24, an air outlet 25 is arranged, wherein the air inlet 19 and the air outlet 25 are each connected to a connecting means 17 of the heat supplying means 31. It is also possible that the air inlet 19 and the air outlet 25 are arranged at opposing edges of the same side of the housing.

The housing 6 of the oven 2 is adapted to receive a plurality of carriers 7, which are arranged above each other in a receiving space 26 in the interior of the housing 6. In particular, the carriers 7 may be arranged in a rack 13 as shown in FIG. 1, wherein also the rack 13 is position in the interior of the housing 6.

The housing 6 comprises a plurality of air guiding means 27 which are adapted to guide and/or to adjust the partial air flows above and/or underneath the individual carriers 7 of the received pluralities of carriers 7. In this embodiment, the housing 6 comprises two air guiding means 27, which each are provided as a damper 28 comprising a plurality of adjustable lamellae 47. With the lamellae 47, the partial air flows above and/or underneath the individual carriers 7 are adjustable.

The size and/or the distance of the lamellae 47 correspond to the arrangement of the plurality of carriers 7, so that the air flow above and/or underneath the individual carriers may be adjusted. The partial air flow in the gaps 14 between the carriers 7 as well as the air flow in the gap 48 between the topmost carrier 7 and the top side of the housing 6 and the gap 49 between the lowermost carrier 7 and the floor 18 is shown schematically by the plurality of arrows 50.

The air guiding means 27 are arranged in between the air inlet 19 and the receiving space 26, or between the receiving space 26 and the outlet 25, respectively. As is shown schematically for the guiding means 27 between the inlet 19 and the receiving space 26, the air flow above and/or underneath the carriers 7 may be adjusted by pivoting the lamellae 47, as is schematically depicted by the arrows 29. In particular, the lamellae 47 may each shut off the partial air flow completely so that the respective adjacent gap 14, 48, or 49 is not supplied with further hot air. Thus, by example, if several preform elements having different dimensions and/or choice of material are to be heated in the oven 2, they may each need different heat exposure. The dampers 28 can open and close according to the intended heat exposure for each arrangement of preform building material 8 placed in the oven 2.

The oven arrangement 1 comprises a flow reverse means 30, which is connected to both the air inlet 19 and the air outlet 25 to invert the air flow between the air inlet 19 and the air outlet 25 of the oven 2. By reverting the air flow in the interior of the housing 6, a more uniform heating of the preform building material 8 on the carriers 7 may be obtained. The flow reverse means 30 is connected to both an inlet and an outlet of the heat supplying means 31 which provides the hot air. In particular, the lamellae 47 may open in both directions depending on the direction of the air flow in the housing 6.

Returning the hot air from the air outlet 25 to the heat supplying means 31 allows for a re-heating of the returned air and therefore for reducing the energy consumption of the heating process. Alternatively, the flow reverse means and/or the second air guiding means 27 on the side 24 of the housing 6 may be omitted and the hot air may be emitted to the surroundings of the oven 2 through the air outlet 25, which is in this case not connected to a connecting means 17 of the heat supplying means 31.

It is possible that the heat supplying means 31 is adapted to supply also unheated and/or cooled air to the oven 2. This enables an active cooling of the preform building material 8 once the heating is finished. An active cooling reduces the time until the manufactured preform building elements may be touched, transported and/or further processed.

Figure 3:
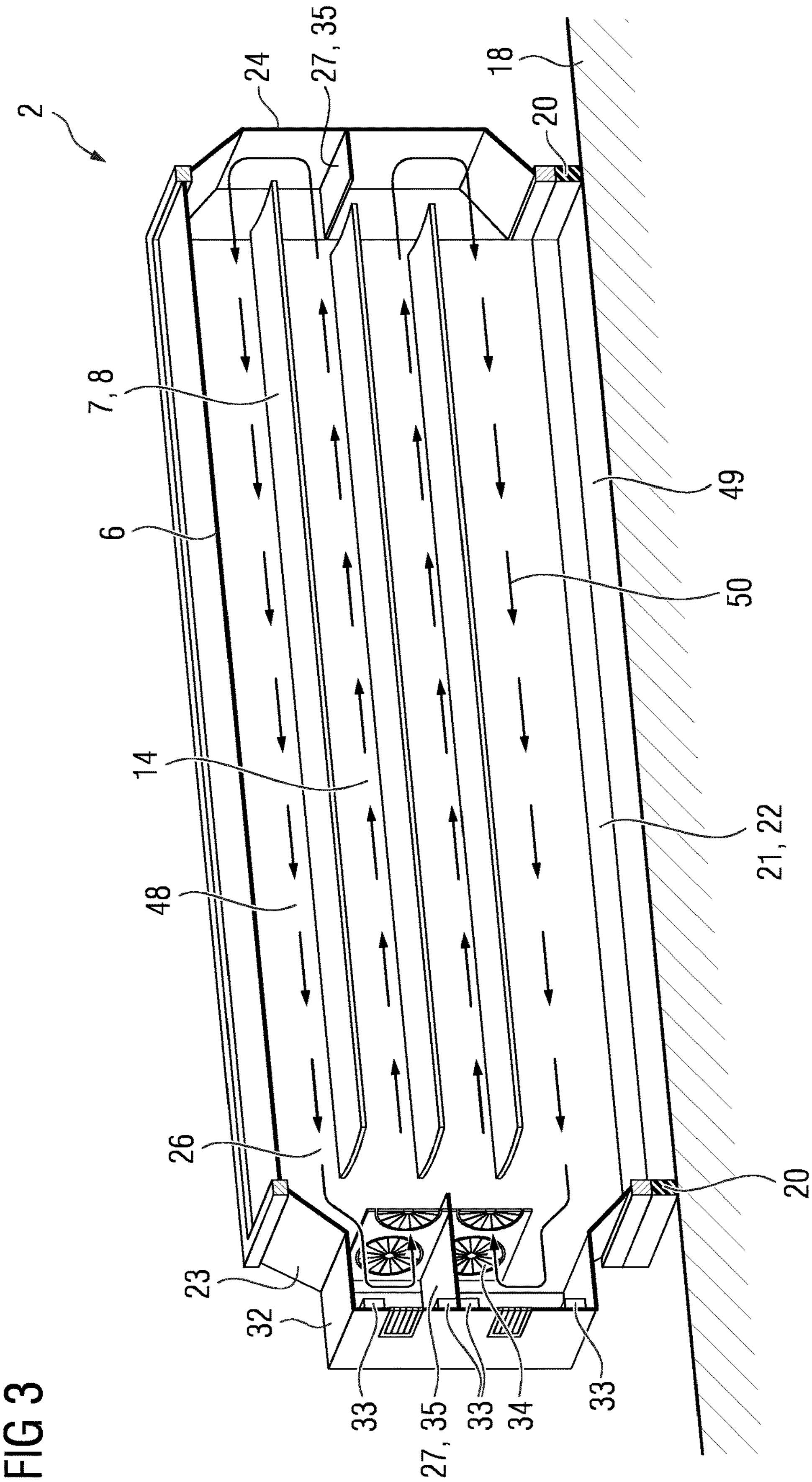
FIG. 3 shows a second embodiment of an oven arrangement.

In FIG. 3, a second embodiment of an oven 2 is shown. In this embodiment, the oven 2 comprises a heating means 32, which is arranged on the first side 23 of the housing 6 of the oven 2. The heating means 32 comprises a plurality of resistive heating means 33 and a plurality of air convection means 34. The resistive heating means 33 are electrically heatable resistors and the convection means 34 are provided as fans for creating an air flow in the interior of the housing 6.

In this embodiment, the air guiding structures 27 each comprise an air guiding panel 35 for creating a meandering air flow around the carriers 7 in the interior of the housing 6. It is possible that also on the second side 24 of the housing 6, an additional heating means, in particular corresponding to the heating means 32 at the first side 23 of the housing 6, is arranged.

Additionally or as an alternative to the resistive heating means 33, the heating means 32 may also comprise a radiating heating means, for instance an infrared lamp or the like, and/or at least one heating means 32 based on a circulating liquid, for instance a liquid circulating in pipes in the walls of the housing 6, or arranged on at least one inner wall and/or on at least one outer wall of the housing. The liquid may be heated using a heating device arranged at the oven 2 or a further heating device of the oven arrangement 1, which is connected to the oven 2, for instance by connection means likes flexible pipes, tubes or hoses, for instance like described in relation to the connection of the heat supplying means 31 in FIG. 2.

It is possible that the heating means 32 is also adapted to cool the interior of the housing 6. Therefore, the heating means 32 may comprise one or more electrically and/or mechanically cooling devices for providing cool air in the interior of the housing 6. This allows for using the oven 2 also for an active cooling of the preform building material 8 after a heating process. In particular, a heating means 32 based on a circulating liquid may be used for cooling by the circulation of a cooled liquid. In addition, other types of cooling means, for instance electrical cooling means or an air conditioning device comprising a compressor or the like, may be used.

Figure 4:
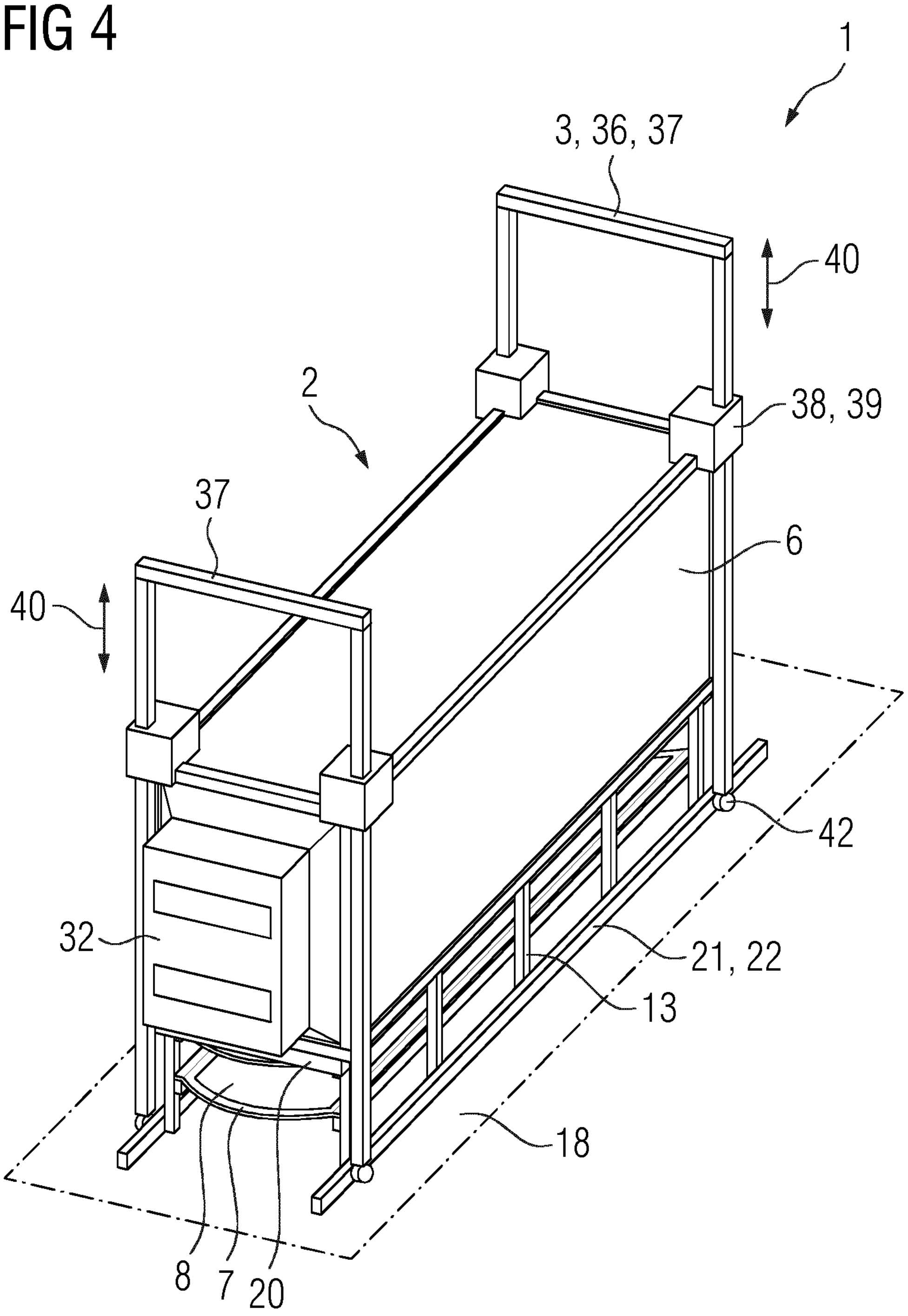
FIG. 4 shows a third embodiment of an oven arrangement.

In FIG. 4, a third embodiment of an oven arrangement 1 is shown. The depicted oven 2 is constructed according to the second embodiment of the oven shown in FIG. 3. However, it is also possible another embodiment of an oven 2, for instance the oven 2 depicted in FIG. 2, is used in the third embodiment of the oven arrangement 1.

In the third embodiment, the lifting means 3 is a lifting device 36 which is supporting the oven 2 on the floor 18. The lifting device 36 comprises two frame structures 37 and a motor arrangement 38, which comprises for instance four electrical motors 39. The motors 39 couple the frame structures 37 and the housing 6, so that the housing 6 is liftable along the frame structure 37 by the motor arrangement 38. The motors 39 may comprise for instance actuatable gears, which mesh each with a geared rack of the frame structures 37. This allows for lifting and/or lowering the oven 2 by the lifting device 36, as it is schematically indicated by the arrows 40.

To allow also for a lateral movement of the oven 2, the lifting device 36 comprises a plurality of wheels 42, so that the oven 2 may be moved along the floor of a manufacturing facility. This allows for arranging the oven above different racks 39 comprising the carriers 7 with the preform building material 8.

Figure 5:
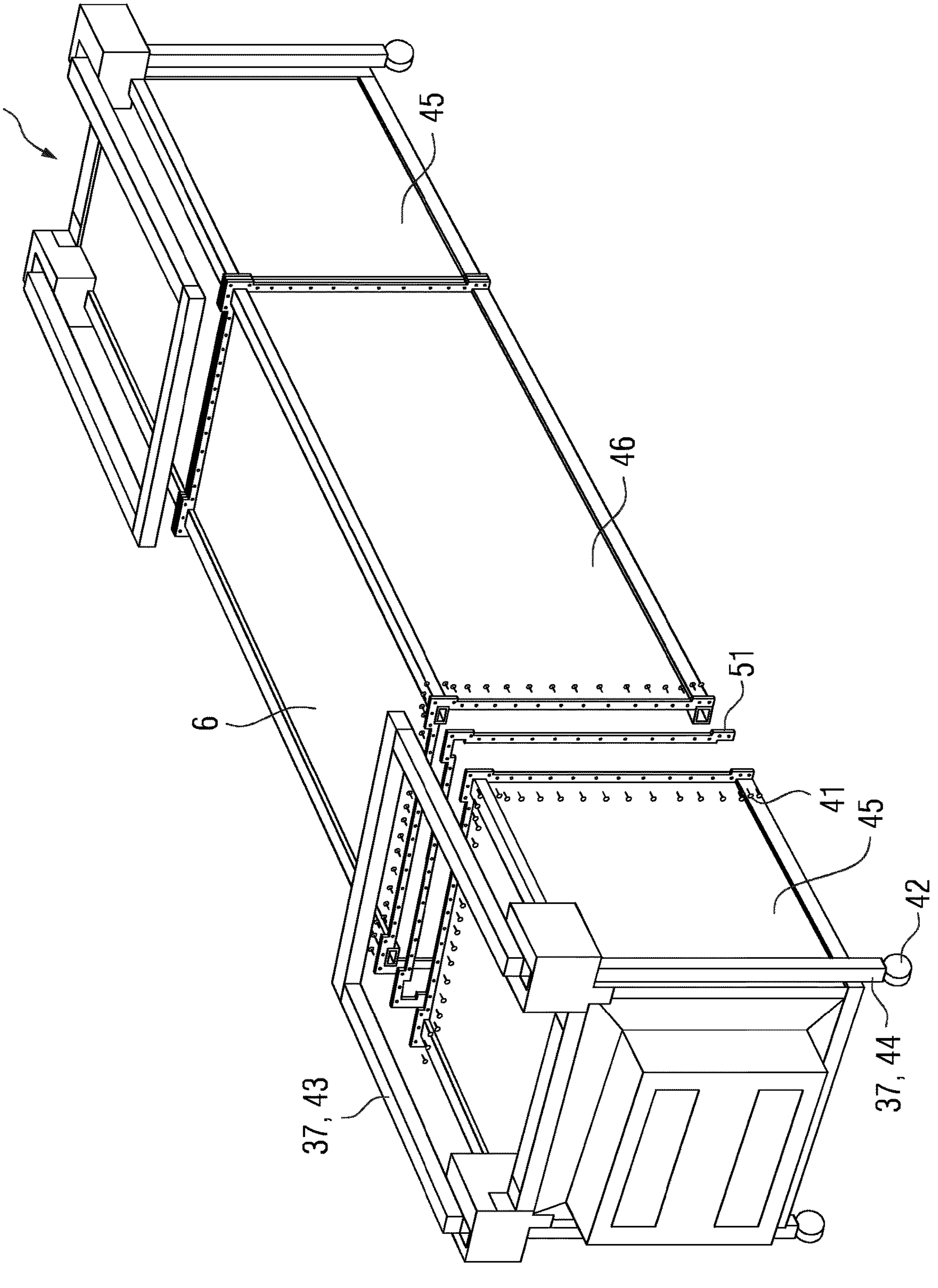
FIG. 5 shows a fourth embodiment of an oven arrangement.

As it is depicted in FIG. 5 in a fourth embodiment of the oven arrangement 1, a top portion 43 of the frame structure 37 may be partly foldable and/or collapsible, when the oven 2 is in a lowered position. The frame structure 37 may be folded as depicted in FIG. 5 or it may be for instance collapsed by sliding it into the lower portion 44 of the frame structure 37.

In the fourth embodiment, the housing 6 of the oven 2 is modular and comprises two or more housing segments 45, 46. This allows for assembling the housing 6 of the oven 2 from the two end side segments 45 for providing a shorter oven or for adapting the oven 2 to longer carriers 7 by arranging one or more additional, intermediate segments 46 in between the end side segments 45. The length of the individual segments 45, 46 may also vary for further adjustment of the size of the oven 2. The segments may be releasably attached towards each other by using a plurality of fixation means 41, in particular a plurality of bolts. Between two adjacently fixated housing segments 45, 46, a sealing 51 may be arranged for sealing the interior of the housing 6.

Adjusting the length of the housing 6 of the oven 2 allows for adapting the housing to differently sized carriers 7 and therefore to different sizes of preform building elements to be manufactured using the oven arrangement 1. The segmentation of the housing 6 also allows for dismantling of the oven 2 and for making it easier to move it around in the production facility and/or to transport it to another location, for instance to use it in different production facilities and/or for servicing. The modular housing 6 may also be used in any of the other embodiments of the oven arrangement 1.

In each embodiment of the oven arrangement 1, the size of the housing 6 and consequently also the size of the opening 9 at the bottom side 10 of the housing 6 and/or the interior volume of the housing 6, which is accessible through the opening 9 in the bottom side 10 of the housing 6, have a size comparable to the size of the preform building elements to be manufactured from the preform building material 8 arranged on the plate-like carrier 7, or corresponding to the size of the plate-like carrier 7, respectively. In particular, the opening 9 at the bottom side of the housing 6 and consequently also the interior volume may have a width between 1 m and 4 m and a length between 2.5 m and 12 m. Also, a larger width and/or a larger length of the opening 9 and/or the housing 6 is possible, so that a plurality of carriers 7 arranged juxtaposed may be received in the housing.

The height of the oven 2, and correspondingly the height of its inner volume, may depend on the shape and the numbers of carriers 7 that are receivable in the oven 2 and/or on the height of a preform mold, if the oven shall be arranged on a preform mold arrangement. The height may be for instance between 0.5 m and 4 m. Inside the housing of the oven, for instance between one and twelve carriers 7, or a rack 13 carrying between one and twelve carriers 7, may be receivable. However, also more than twelve carriers 7 may be received in the oven 2. The oven 2 of all embodiments may be adapted to heat the interior of the housing 6 to temperatures between 70° C. and 130° C., depending on the type of binding agent used in the preform building material 8.

In an embodiment of a method for manufacturing preform building elements used for building a rotor blade of a wind turbine, a carrier arrangement comprising one or more carriers 7 and an oven arrangement 1 comprising an oven 2 and a lifting means 3 are provided. The carrier arrangement may be provided initially as a plurality of carriers 7, which are arranged for instance on individual frames allowing for individually accessing the surfaces of the carriers 7. The carrier 7 arranged on the frame may be considered as a preform mold.

The preform building material 8 is provided to the one or more of the carriers 7. Therefore, the preform building material 8 is arranged on the surface 11 of the carriers 7 in accordance to the preform elements to be fabricated from the respective preform building material 8. Then, in a first alternative, an oven 2 adapted for receiving a single carrier 7 with the corresponding preform building material 8 arranged on its surface may be lowered on the individual carriers 7 on their frames. This has the advantage that the carriers 7 do not have to be moved prior to the heating which initiates the consolidation of the preform building elements by the binding agent.

Alternatively, the carriers 7 may be arranged in a rack 13 for forming a plurality of carriers 7, wherein afterwards the oven 2 is lowered on the rack 13, or on the plurality of carriers 7, respectively. This allows for simultaneous heating of a plurality of different preform building material arrangements used for fabricating different types of preform building elements. After lowering the oven on the carrier arrangement, the preform building material 8 is heated using the oven 2. After the heating, the preform building material 8, or the manufactured preform building element, respectively, may be cooled. This may occur either by lifting the oven 2, so that the preform building material 8 is exposed to the surroundings, or by using a cooling means, or a heating means 32 also adapted to cool the interior of the housing 6, respectively, as previously described.

The preform building element is prepared on a surface 11 separatable from a mold frame holding the mold surface, or the plate-like carrier 7, respectively, so that the arranged preform building material 8 can be taken out of the mold frame to carry the preform element for further processing, in particular for the heating step. Since the mold frame is not exposed to any heating and/or cooling in the oven 2, it will be dimensionally more stable and can be used longer in the manufacturing of the preform building elements.

In the method for manufacturing preform building elements used for building a rotor blade of a wind turbine, any of the aforementioned embodiments of the oven 2, or the oven arrangement 1, respectively, may be used.

In particular, the heating step of the method may be controlled and monitored by a control unit of the oven arrangement 1 and/or a plurality of sensors arranged in the oven 2 and/or on the carriers 7, so that no manual work is needed to operate the oven 2. Also, an automated control of the lifting means 3 is possible. When an oven 2 according to the first embodiment is used, the dampers 28, in particular the individual lamellae 47, may be sensor-controlled and adjustable by the control unit of the oven arrangement 1 to allow for an automatic control of the individual heating processes of the different preform elements to be fabricated.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An oven arrangement, configured to heat preform building material arranged on at least one plate-like carrier for producing preform building elements used for building a rotor blade of a wind turbine, comprising:

at least one oven;

at least one lifting means, a housing configured to receive the carrier, wherein the housing comprises an opening at a bottom side of the housing for positioning the carrier in an interior of the housing by lowering the oven over the carrier using the lifting means, wherein the oven comprises at least one heating means and/or wherein the oven is connectable to a heat supplying means.

2. The oven arrangement according to claim 1, wherein the housing is configured to receive a plurality of carriers arranged above of each other in a rack.

3. The oven arrangement according to claim 1, wherein the oven comprises at least one sealing means arranged at least partly around the opening on the bottom side of the housing and/or that the oven arrangement comprises a sealing arrangement comprising one or more sealing structures for sealing the interior of the housing when the oven is in a lowered position.

4. The oven arrangement according to claim 1, wherein the at least one heating means comprises at least one resistive heating means, at least one radiating heating means, at least one heating means based on a circulating liquid, and/or at least one convection means, and/or that the at least one heating means is configured additionally for a cooling of the interior of the housing.

5. The oven arrangement according to claim 1, wherein the heat supplying means is a hot air supplying means, wherein the housing of the oven comprises at least one air inlet, through which air supplied by the heat supplying means is suppliable to the interior of the housing, and at least one air outlet, through which air supplied to the interior of the housing is emittable to the surroundings of the oven and/or returnable to the heat supplying means.

6. The oven arrangement according to claim 5, wherein the air inlet and the air outlet are arranged at opposing sides of the housing and/or at opposing edges of a housing side, directed downwards for connection to a connection means of the heat supplying means protruding from a floor.

7. The oven arrangement according to claim 5, wherein the oven arrangement comprises at least one flow reverse means connected to the air inlet and the air outlet to invert the air flow between the air inlet and the air outlet of the oven.

8. The oven arrangement according to claim 1, wherein the oven is configured to receive a plurality of carriers, which are arranged above each other in a receiving space in the interior of the housing, wherein the housing comprises at least one air guiding means configured to guide and/or to adjust the partial air flows above and/or underneath the individual carriers of a received plurality of carriers.

9. The oven arrangement according to claim 8, wherein the air guiding means is configured to create a meandering air flow in the interior of the housing, wherein the partial air flows stream in alternating direction between the carriers of a plurality of carriers received in a receiving space.

10. The oven arrangement according to claim 8, wherein the air guiding means comprises one or more dampers, wherein the dampers each comprise a plurality of adjustable lamellae, with which the air flow above and/or underneath the individual carriers is adjustable.

11. The oven arrangement according to claim 1, wherein the heat supplying means is configured to supply unheated and/or cooled air to the oven.

12. The oven arrangement according to claim 1, wherein the lifting means is a crane attachable or attached to the oven or a lifting device supporting the oven.

13. The oven arrangement according to claim 12, wherein the lifting device comprises at least one frame structure and a motor arrangement comprising one or more motors coupled to the frame structure and the housing, wherein the housing, is liftable and lowerable along the at least one frame structure by the motor arrangement.

14. The oven arrangement according to claim 13, wherein a top portion of the at least one frame structure is partly foldable and/or collapsible, when the oven is in a lowered position.

15. The oven arrangement according to claim 1, wherein the housing is a modular housing comprising two or more housing segments removably attached to each other.

16. A method for manufacturing preform building elements used for building a rotor blade of a wind turbine, comprising:

providing a carrier arrangement comprising one or more carriers and an oven arrangement comprising an oven and a lifting means;

providing preform building material on the one or more carriers;

lowering the oven lifted by the lifting means on the carrier arrangement; and heating the preform building material using the oven.

17. The method according to claim 16, wherein an oven arrangement is used.

* * * * *